US011975362B2

(12) United States Patent
Xiao et al.

(10) Patent No.: US 11,975,362 B2
(45) Date of Patent: May 7, 2024

(54) DUAL-LAYER LINEAR CROSS BELT SORTING SYSTEM

(71) Applicant: KENGIC INTELLIGENT TECHNOLOGY CO., LTD., Qingdao (CN)

(72) Inventors: Jinfei Xiao, Qingdao (CN); Bing Tang, Qingdao (CN); Min Fan, Qingdao (CN); Chunyang Huang, Qingdao (CN); Xiaofen Yao, Qingdao (CN)

(73) Assignee: KENGIC INTELLIGENT TECHNOLOGY CO., LTD., Qingdao (CN)

( * ) Notice: Subject to any disclaimer, the term of this patent is extended or adjusted under 35 U.S.C. 154(b) by 244 days.

(21) Appl. No.: 17/780,539

(22) PCT Filed: Jun. 12, 2020

(86) PCT No.: PCT/CN2020/095701
§ 371 (c)(1),
(2) Date: May 27, 2022

(87) PCT Pub. No.: WO2021/128756
PCT Pub. Date: Jul. 1, 2021

(65) Prior Publication Data
US 2022/0410214 A1   Dec. 29, 2022

(30) Foreign Application Priority Data
Dec. 27, 2019   (CN) .......................... 201911376034.X

(51) Int. Cl.
B07C 3/06   (2006.01)
B07C 3/08   (2006.01)
(Continued)

(52) U.S. Cl.
CPC .................. *B07C 3/06* (2013.01); *B07C 3/08* (2013.01); *B65G 23/06* (2013.01); *B65G 23/44* (2013.01); *B65G 47/46* (2013.01); *B65G 2207/30* (2013.01)

(58) Field of Classification Search
CPC .... B65G 47/46; B65G 2207/30; B65G 23/44; B65G 23/06; B07C 3/06; B07C 3/08
(Continued)

(56) References Cited

U.S. PATENT DOCUMENTS 5,901,830 A  *  5/1999  Kalm ................... B65G 17/345
                                                    198/370.06

FOREIGN PATENT DOCUMENTS

CN   205452036   *   8/2016
CN   206720100   *  12/2017
(Continued)

*Primary Examiner* — Gene O Crawford
*Assistant Examiner* — Lester Rushin, III
(74) *Attorney, Agent, or Firm* — Bayramoglu Law Offices LLC

(57) ABSTRACT

A dual-layer linear cross belt sorting system is provided, including a package supply table, a sorting loop, a platform, sliding chutes and a scanning device. The sorting loop is of a closed-loop and dual-layer linear conveying structure in a vertical direction, and the sorting loop includes sorting trolleys connected along a single queue, two sets of dual-layer rails formed by connecting bent rails located at two ends and straight rails located at upper and lower layers to each other by an internal welding, a driving component and a tensioning component. The driving component and the tensioning component constitute a transmission structure of the sorting loop and are located at two ends of the sorting loop respectively.

10 Claims, 5 Drawing Sheets

(51) Int. Cl.
    *B65G 23/06* (2006.01)
    *B65G 23/44* (2006.01)
    *B65G 47/46* (2006.01)
(58) Field of Classification Search
    USPC .......................................................... 198/890
    See application file for complete search history.

(56) References Cited

FOREIGN PATENT DOCUMENTS

| | | |
|---|---|---|
| CN | 206720100 U | 12/2017 |
| CN | 207698581 U | 8/2018 |
| CN | 110434075 A | 11/2019 |
| CN | 209635286 U | 11/2019 |
| CN | 111054637 A | 4/2020 |
| EP | 2295155 A1 | 3/2011 |

* cited by examiner

DUAL-LAYER LINEAR CROSS BELT SORTING SYSTEM

CROSS REFERENCE TO THE RELATED APPLICATIONS

This application is the national stage entry of International Application No. PCT/CN2020/095701, filed on Jun. 12, 2020, which is based upon and claims priority to Chinese Patent Application No. 201911376034.X, filed on Dec. 27, 2019, the entire contents of which are incorporated herein by reference.

TECHNICAL FIELD

The invention relates to a newly designed cross belt sorting device, in particular to a dual-layer linear cross belt sorting system, which belongs to the field of logistics sorting.

BACKGROUND

At present, horizontal circular cross belt sorting apparatuses are generally used on logistics sorting operation sites in the e-commerce and express delivery industries. However, horizontal circular cross belt sorting systems are generally occupy a large space. When the space of a site is limited and a horizontal circular cross belt sorting system cannot be designed, it is necessary to design a vertical circular cross belt sorting system.

Existing vertical cross belt sorting systems have high requirements for site space, and the structures of sorting apparatuses and goods transportation manners have to be changed to a great extent. Therefore, existing linear crossing belt systems of a vertical loop design are single-layer sorting systems, which hardly meet use requirements. Moreover, a trolley moves is pushed by a magnetic field, generated by the tangential movement of a linear motor and a secondary plate, to move along a loop, which requires high center-mounting accuracy of the secondary plate, so installation is difficult and maintenance cost is high.

In view of this, this application is hereby filed.

SUMMARY

The invention relates to a dual-layer linear cross belt sorting system, aiming at solving the problems of in the prior art. According to the novel dual-layer linear cross belt sorting system, packages of small or big sizes enter a package supply region and then enter a trolley of a sorting loop from a package supply device, such that simultaneous package supply and automatic sorting at the upper layer and the lower layer are realized, and the whole system is more accurate in sorting and realizes the lightweight and modular apparatus assembly and maintenance.

Another design purpose is to improve the sorting efficiency of a vertical cross belt and further reduce the requirements for site space.

In order to achieve the above design purpose, the dual-layer linear cross belt sorting system comprises a package supply table, a sorting loop, a platform, sliding chutes and a scanning device.

The sorting loop is of a closed-loop and dual-layer linear conveying structure in the vertical direction, and comprises a plurality of sorting trolleys connected along a single queue, two sets of dual-layer rails formed by connecting bent rails located at two ends and straight rails located at upper and lower layers to each other by means of internal welding, a driving component and a tensioning component;

The driving component and the tensioning component constitute a transmission structure of the sorting loop and are located at two ends of the loop respectively; and The dual-layer rails distributed along two sides of the sorting trolleys of the single queue and a synchronous belt connected between the driving component and the tensioning component jointly constitute the vertical, dual-layer linear and closed-loop conveying mechanism of the sorting loop.

Further, in order to ensure that the sorting trolleys are in the horizontal conveying state all the time, so as to realize the supply and sorting of goods on the upper and lower layers, a preferred and improved design is as follows: the driving component has a first driving disc assembly and a second driving disc assembly which are wound from the same side end and drive two sets of synchronous belts, and the tensioning component has a first driven disc assembly and a second driven disc assembly which are wound from the same side end and drive the two sets of synchronous belts;

The first driving disc assembly is staggered relative to the bent rail on the same side, and a vertical circle center of the first driving disc assembly coincides with a circle center of a vertical circle where the bent rail on the other side of the sorting trolleys is located; the second driving disc assembly is staggered relative to the bent rail on the same side, and a vertical circle center of the second driving disc assembly coincides with a circle center of a vertical circle where the bent rail on the other side of the sorting trolleys is located;

The first driven disc assembly is staggered relative to the bent rail on the same side, and a vertical circle center of the first driven disc assembly coincides with a circle center of a vertical circle where the bent rail on the other side of the sorting trolleys is located; the second driven disc assembly is staggered relative to the bent rail on the same side, and a vertical circle center of the second driven disc assembly coincides with a circle center of a vertical circle where the bent rail on the other side of the sorting trolleys is located.

To sum up, the dual-layer linear cross belt sorting system of the application has the following advantages:

1. The whole system realizes modular design and assembly, and the bearing strength of a frame is high, which is beneficial to apparatus maintenance, production and overhaul.

2. The sorting loop design and control method featuring simultaneous supply and sorting on the upper layer and the lower layer is realized, sorting is more accurate on the whole, and sorting efficiency is higher.

3. The overall design extendibility of the system is effectively improved, which provides a good interface and foundation for subsequent improvement.

4. The synchronous belt of the loop drives a traveling wheel assembly so as to drive the sorting trolley to run, so that a linear motor and a secondary plate are not needed, which effectively reduces the installation difficulty and greatly saves cost.

BRIEF DESCRIPTION OF THE DRAWINGS

The application will now be further explained with reference to the following drawings.

DETAILED DESCRIPTION OF THE EMBODIMENTS

Figure 1:
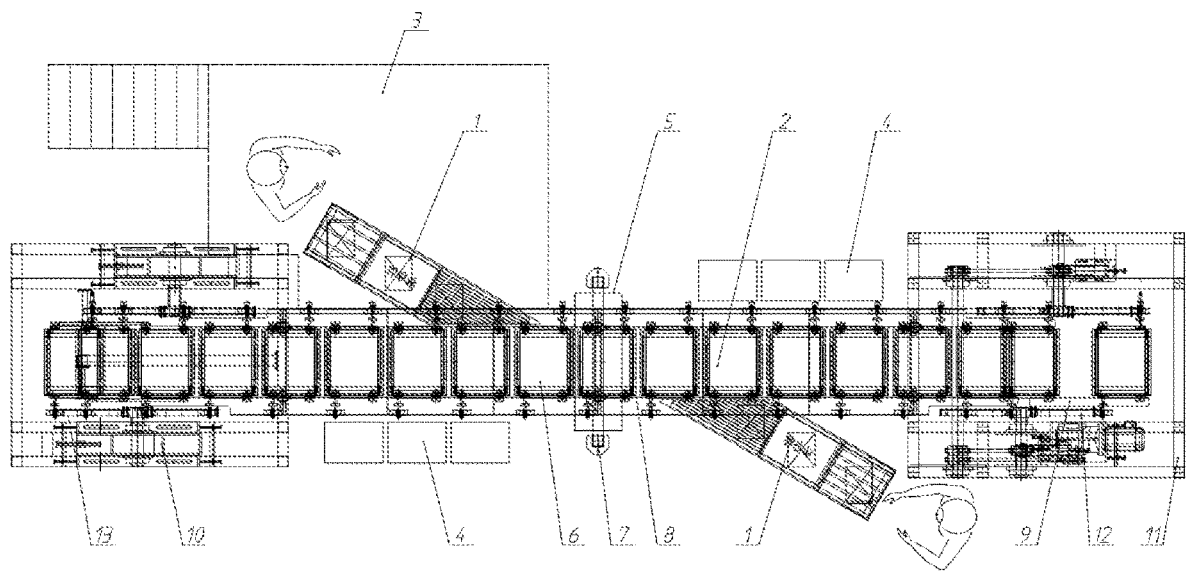
FIG. 1 is a diagram of an overall structure of a dual-layer linear cross belt sorting system.

In Embodiment 1, as shown in FIG. 1, a dual-layer linear cross belt sorting system of the application comprises a package supply table 1, a sorting loop 2, a platform 3, sliding chutes 4 and a scanning device 5.

Packages of small or big sizes first enter the package supply table 1 in a package supply region, and then enter sorting trolleys 6 of the sorting loop 2 from the package supply table 1, and the packages are sent to designated cells under the control of a control system to realize automatic sorting.

The package supply table 1 is provided with a grating or photoelectric unit to detect the shape of goods and feed detection results back to a PLC system; moreover, the package supply table 1 is designed with a dynamic weighing function, so as to weigh the packages in the conveying process to collect goods data, thus saving sorting time and providing a basic guarantee for subsequent accurate sorting; and The platform 3 is a frame structure for supporting the whole system, and the platform 3 is designed as a multi-layer structure to match the sorting loop 2.

The sliding chutes 4 are arranged on both sides of the sorting loop 2 and located on upper and lower layers respectively, so that the sorting trolleys 6 can run to both the upper layer and the lower layer to sort goods to designated cells;

The sorting loop 2 is of a closed-loop and dual-layer linear conveying structure in the vertical direction, and is equipped with a scanning device to take pictures, identify barcode information of goods and feed the barcode information back to the PLC system;

The sorting loop 2 comprises a plurality of sorting trolleys 6 connected along a single queue, two sets of dual-layer rails formed by connecting bent rails 9 located at two ends and straight rails 8 located at the upper and lower layers to each other by means of internal welding, a middle supporting frame 7, a left supporting frame 10, a right supporting frame 11, a driving component 12 and a tensioning component 13; and The sorting trolleys 6 run on the two sets of dual-layer rails at the same time in sequence, and each sorting trolley 6 is of a modular design, which facilitates assembly and disassembly and realizes the lightweight.

The middle supporting frame 7, the left supporting frame 10 and the right supporting frame 11 all have a dual-layer structure, with the bottom connected to an anchor fastener by a bolt so as to adjust the surface alignment of the straight rail 8 and the bent rail 9 after installation, and provide installation support points for the upper and lower rails.

The driving component 12 and the tensioning component 13 constitute a transmission structure of the sorting loop 2 and are located at two ends of the loop respectively.

Figure 2:
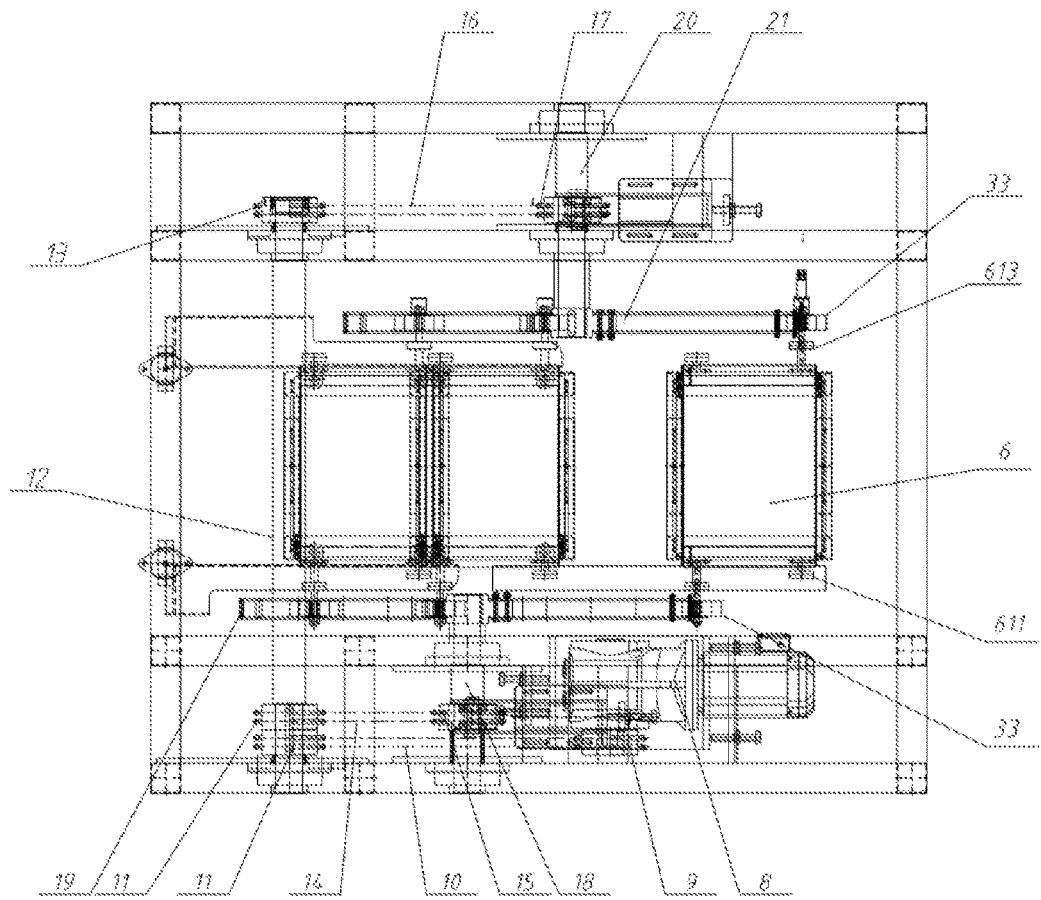
FIG. 2 is a structural diagram of a driving component.

As shown in FIG. 2, a first sprocket 15 of the driving component 12 is connected to an output shaft of a motor 14, which drives the first sprocket 15 to rotate when rotating; the first sprocket 15 is connected to a second sprocket 17 through a first chain 16, and the first sprocket 15 rotates to drive the second sprocket 17 to rotate;

Two second sprockets 17 are fixedly connected to one end of a first driving shaft 18, a third sprocket 19 is fixedly connected to the other end, and when the second sprockets 17 rotate, the third sprocket 19 at the other end rotates too;

The third sprocket 19 is connected to a fifth sprocket 23 through a second chain 22, and when the third sprocket 19 rotates, the fifth sprocket 23 rotates too; meanwhile, the other second sprocket 17 fixed at one end of the first driving shaft 18 is connected to a fourth sprocket 21 through a third chain 20, so the second sprocket 17 drives the fourth sprocket 21 to rotate when rotating; and The fourth sprocket 21 is connected to a first driving disc assembly 25 through a second driving shaft 24, and the fifth sprocket 23 is connected to a second driving disc assembly 27 through a third driving shaft 26. When the motor 14 rotates, the first driving disc assembly 25 and the second driving disc assembly 27 rotate too through the transmission of aforementioned intermediate mechanisms.

The first driving disc assembly 25 and the second driving disc assembly 27 are of the same structure, and both are of a novel design.

Figure 3:
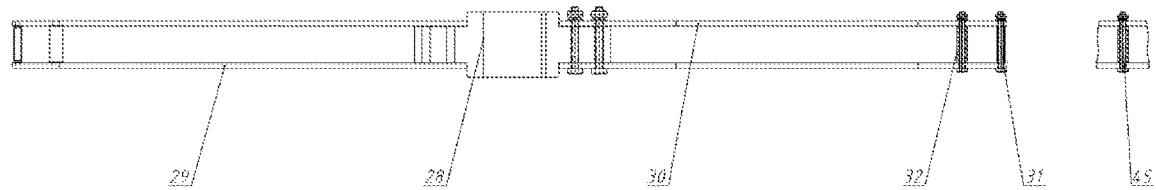
FIG. 3 is a structural diagram of a first driving disc assembly.

As shown in FIG. 3, the first driving disc assembly 25 is composed of a flanged shaft 28, a first circular plate 29, a second circular plate 30, a bolt 31, a nylon spacer 32, etc. The first circular plate 29 and the second circular plate 30 are each provided with two fixing holes along an outer ring, the fixing holes of the first circular plate 29 correspond to the fixing holes of the second circular plate 30, and the first circular plate 29 and the second circular plate 30 are fixedly connected by the bolt 31. The nylon spacer 32 is arranged outside the bolt 31 to reduce the wear and tear of the bolt 31 and the synchronous belt during cogged matching movement, thus playing a protective role.

The flanged shaft 28 is fixed to the first circular plate 29 and the second circular plate 30 by bolts respectively, so as to be connected to the second driving shaft 24, and also increase the structural strength of the first driving disc assembly 25.

The structure of the second driving disc assembly 27 is the same as that of the first driving disc assembly 25, and will not be repeated here.

The driving component 12 described above adopts chain transmission, and a tensioning mechanism is correspondingly installed on the middle supporting frame 7 to adjust the tension of the chain.

Figure 5:
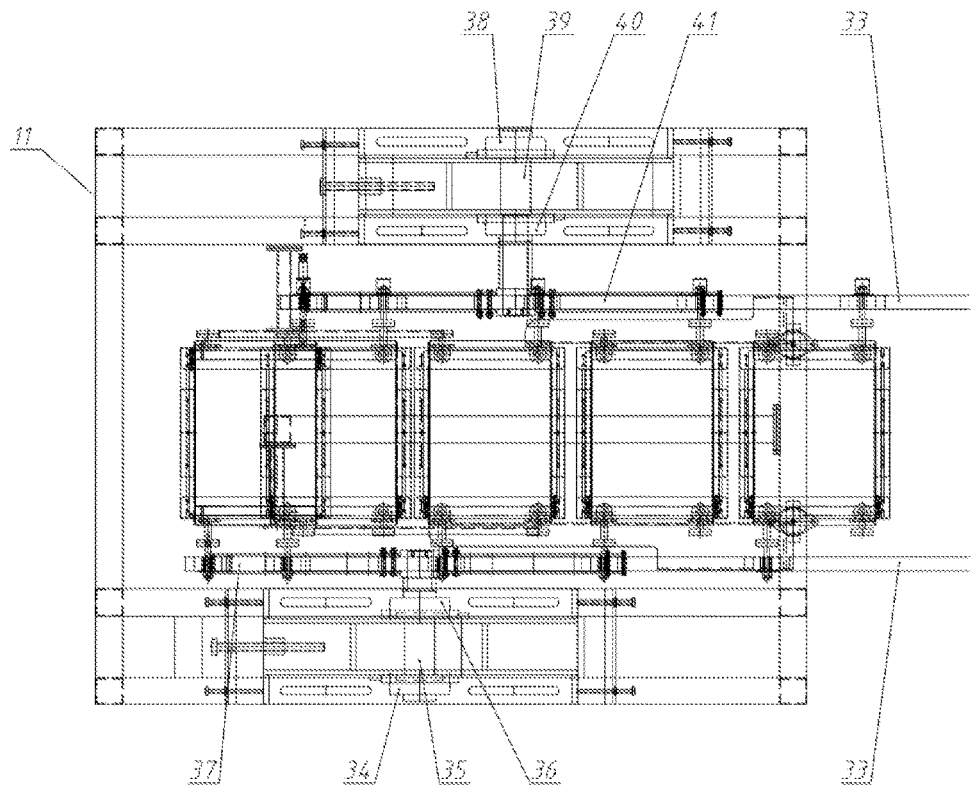
FIG. 5 is a structural diagram of a tensioning component.

As shown in FIG. 5, a first tensioning shaft 35 of the tensioning component 13 is fixed to the right supporting frame 11 through a first bearing seat 34 and a second bearing seat 36, and the first driven disc assembly 37 is connected to the first tensioning shaft 35. The structure of the first driven disc assembly 37 is the same as the structure of the first driving disc assembly 25. Both of them form a certain pitch through two fixed circular plates, and make cogged matching movement with the synchronous belt.

A second tensioning shaft 39 is fixed to the right supporting frame 11 through a third bearing seat 38 and a fourth bearing seat 40, and the second driven disc assembly 38 is connected to the second tensioning shaft 39.

The structures of the first driven disc assembly 37 and the second driven disc assembly 38 are the same as the structure of the first driving disc assembly 25. All of them form a certain pitch through two fixed circular plates, and make cogged matching movement with the synchronous belt 33.

With the above structure, the first driving disc assembly 25 of the driving component 12 and the first driven disc assembly 37 of the tensioning component 13 are connected through the closed-loop type synchronous belt 33 to form a movement mechanism of the whole sorting loop 2. The second driving disc assembly 27 of the driving component 12 and the second driven disc assembly 38 of the tensioning component 13 form an auxiliary operation mechanism of the whole sorting loop 2 through the closed-loop type synchronous belt 33 on the other side, so that a whole machine transmission mechanism of the sorting loop 2 is formed.

Figure 4:
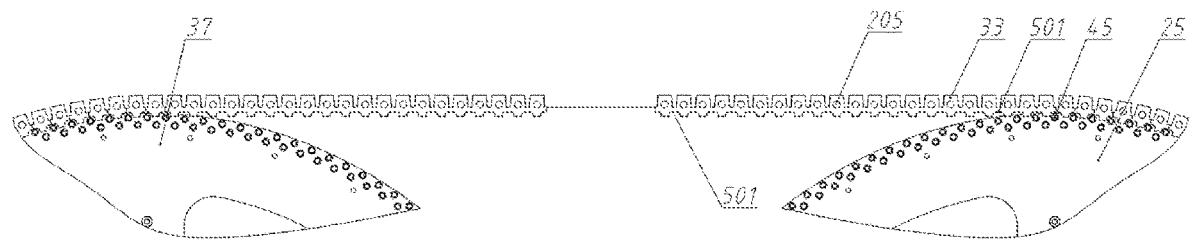
FIG. 4 is a diagram of a matching structure of a synchronous belt and a disc assembly.

As shown in FIGS. 3 and 4, taking the matching and connecting structure of the synchronous belt 33 and the first driving disc assembly 25 as an example, a tooth socket 501 of the synchronous belt 33 is matched with a hinge pin assembly 45 composed of the bolt 31 and the nylon spacer 32 of the disc assembly. When the disc assembly rotates, the hinge pin assembly 45 will be stuck in the tooth socket 501 of the synchronous belt 33, and the hinge pin assembly 45 will gradually match the tooth socket 501 of the synchronous belt 33 along a movement path, so that the synchronous belt 33 is synchronously driven to move forward.

At the same time, the tooth socket 501 of the synchronous belt 33 is also matched with the disc assembly of the first driven disc assembly 37, and the synchronous belt 33 reciprocates from one side end of the sorting loop 2 to the other side under the joint drive of the two disc assemblies. The plurality of sorting trolleys 6 are sequentially fixedly connected to the synchronous belt 33 through shaft holes 205 respectively, thus realizing the synchronous operation of the sorting trolleys 6 driven by the synchronous belt 33.

Figure 6:
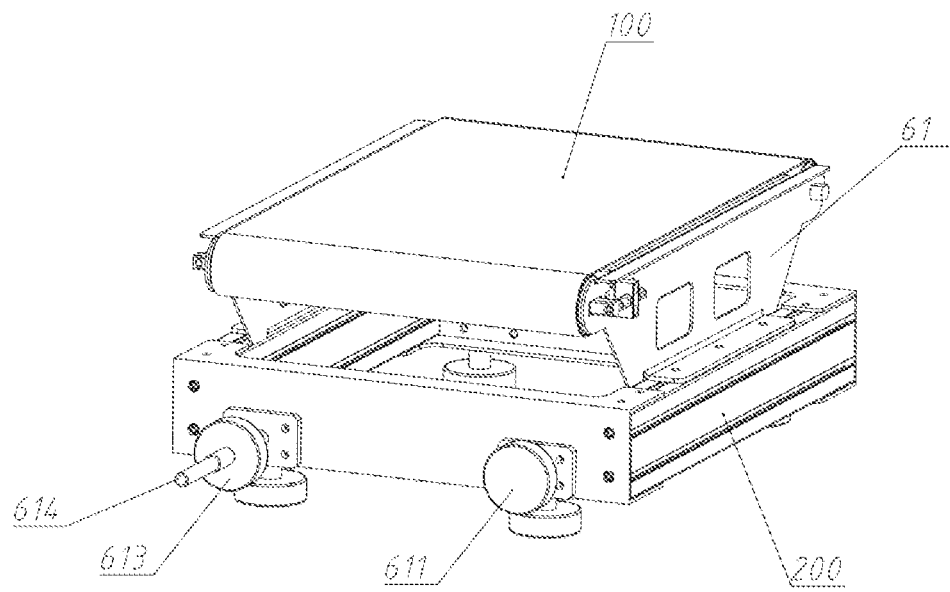
FIG. 6 is a structural diagram of a sorting trolley.

As shown in FIG. 6, the sorting trolley 6 is of a modular structural design and divided into two parts, an upper conveying unit 100 and a lower frame assembly 200. The whole structure of the sorting trolley 6 is of a modular design, the upper and lower structures are simple and compact, the whole structure is light, installation is easy and time-saving, and maintenance is convenient.

The upper conveying unit 100 is fixedly connected to two sets of frame profiles 612 of the lower frame assembly 200 by bent side plates 61 on both sides and a plurality of sets of T-bolts. The bent side plate 61 is an integral part bent at two ends, whose upper bending size is small and lower bending size is large.

Figure 7:
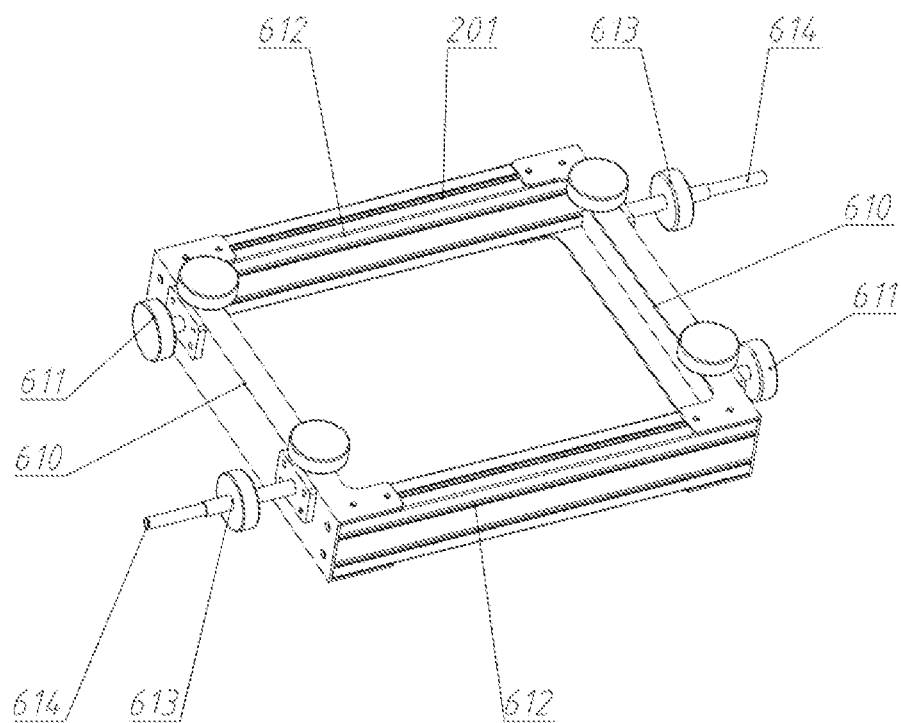
FIG. 7 is a structural diagram of a lower frame assembly of a trolley.
Figure 8:
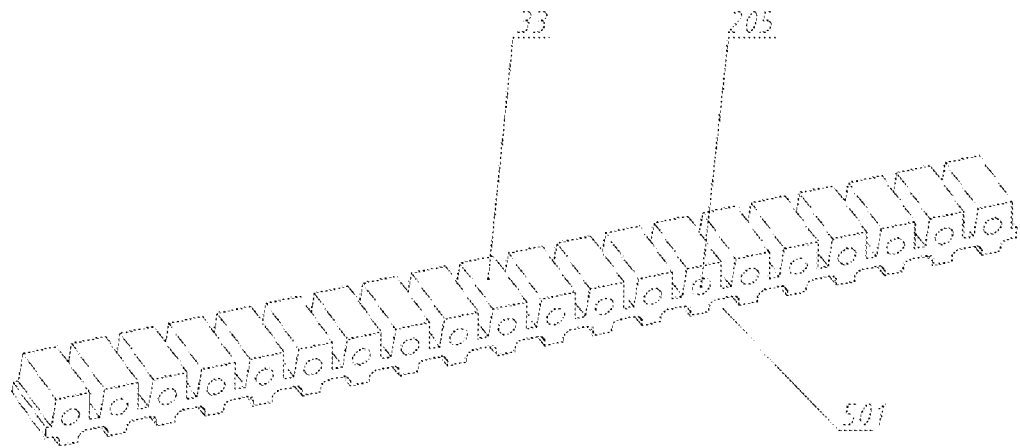
FIG. 8 is a structural diagram of a synchronous belt.

As shown in FIGS. 7 and 8, the lower frame assembly 200 mainly comprises two sets of frames 610 on the left and right respectively, two sets of traveling wheel assemblies 611, two sets of frame profiles 612 and two sets of guide traveling wheel assemblies 613.

Grooves 201 are formed in each side of the frame profile 612, and the grooves 201 are connected to the bottom of the bent side plate 61 through fasteners.

The two sets of frames 610 and the two sets of frame profiles 612 are fixed by bolts to form the whole frame, the two sets of guide traveling wheel assemblies 613 are symmetrically distributed along the whole frame, and traveling wheel shafts 614 are connected to the guide traveling wheel assemblies 613.

One end of the guide traveling wheel assembly 613 is fixed to the frame 610 in the same way as before, but the traveling wheel shaft 614 at the other end of the guide traveling wheel assembly 613 plays a guiding role, that is, a protruding shaft part is mainly used to facilitate the connection with the synchronous belt 33 of the loop. When the traveling wheel shaft 614 is inserted into a pin hole 205 of the synchronous belt 33 of the loop, the lower frame assembly 200 including the guide traveling wheel assembly 613 and the frame 610 can be synchronously driven to run along with the movement of the synchronous belt 33.

One set of traveling wheel assemblies 611 and one set of guide traveling wheel assemblies 613 are connected to each frame 10.

The frame 610 is of a U-shaped profile structure, and has a bottom welded with two sets of guide wheels, which can ensure that the sorting trolleys 6 run smoothly on a rail guide surface.

The traveling wheel shaft 614 is inserted into the pin hole 205 of the synchronous belt 33 of the loop, and the two are assembled to form a trolley loop. Therefore, it is ensured that the sorting trolleys 6 can run synchronously with the synchronous belts 33 of the loops on the left and right sides.

That is, the plurality of sorting trolleys 6 running on the circular dual-layer rails on both sides through the two sets of traveling wheel assemblies 611 and the two sets of guide traveling wheel assemblies 613, together with the two sets of synchronous belts 33 on the left and right sides and the circular dual-layer rails on both sides, form the whole conveying and sorting loop of the dual-layer linear cross belt sorting system described in this application.

As shown in FIG. 7, a set of two traveling wheel assemblies 611 of the sorting trolley 6 are arranged along the lower frame assembly 200 in a central symmetry manner, and similarly, a set of two guide traveling wheel assemblies 613 are horizontally arranged along the lower frame assembly 200 in a central symmetry manner. The traveling wheel assembly 611 and the guide traveling wheel assembly 613 are in contact with rail surfaces of the straight rail 8 and the bent rail 9 on both sides.

Figure 9:
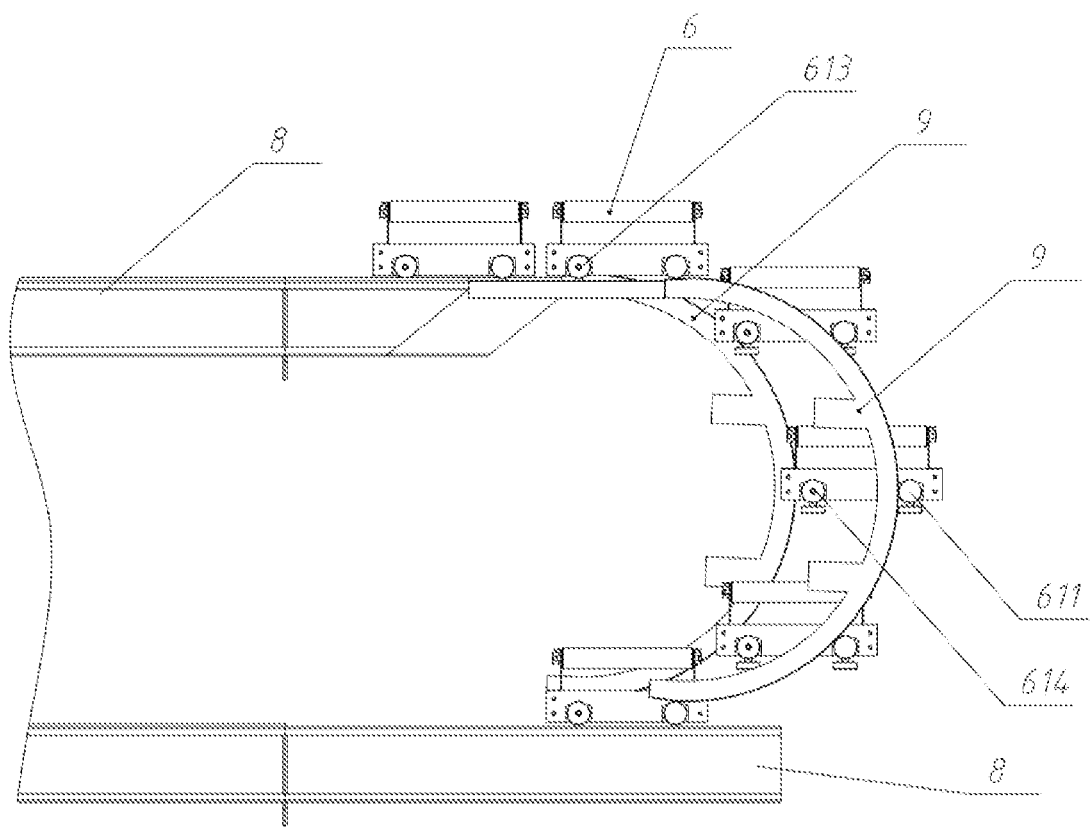
FIGS. 9 and 10 are diagrams showing the transition of a sorting trolley from a straight rail to a bent rail.

As shown in FIGS. 2, 5 and 9, the dual-layer rails distributed along the two sides of the sorting trolleys 6 of the single queue and a synchronous belt 33 connected between the driving component 12 and the tensioning component 13 jointly constitute the vertical, dual-layer linear and closed-loop conveying mechanism of the sorting loop 2.

It can be seen from the figure that the bent rail 9 is designed to be staggered relative to the center of the disc in this application.

Specifically, the first driving disc assembly 25 is staggered relative to the bent rail 9 on the same side, and a vertical circle center of the first driving disc assembly 25 coincides with a circle center of a vertical circle where the bent rail 9 on the other side (the side where the second driving disc assembly 27 is located) of the sorting trolleys 6 is located; and the second driving disc assembly 27 is staggered relative to the bent rail 9 on the same side, and a vertical circle center of the second driving disc assembly 27 coincides with a circle center of a vertical circle where the bent rail 9 on the other side (the side where the first driving disc assembly 25 is located) of the sorting trolleys 6 is located.

Based on the same principle, the first driven disc assembly 37 is staggered relative to the bent rail 9 on the same side, and a vertical circle center of the first driven disc assembly 37 coincides with a circle center of a vertical circle where the bent rail 9 on the other side (the side where the second driven disc assembly 38 is located) of the sorting trolleys 6 is located; and the second driven disc assembly 38 is staggered relative to the bent rail 9 on the same side, and a vertical circle center of the second driven disc assembly 38 coincides with a circle center of a vertical circle where the bent rail 9 on the other side (the side where the first driven disc assembly 37 is located) of the sorting trolleys 6 is located.

Figure 10:
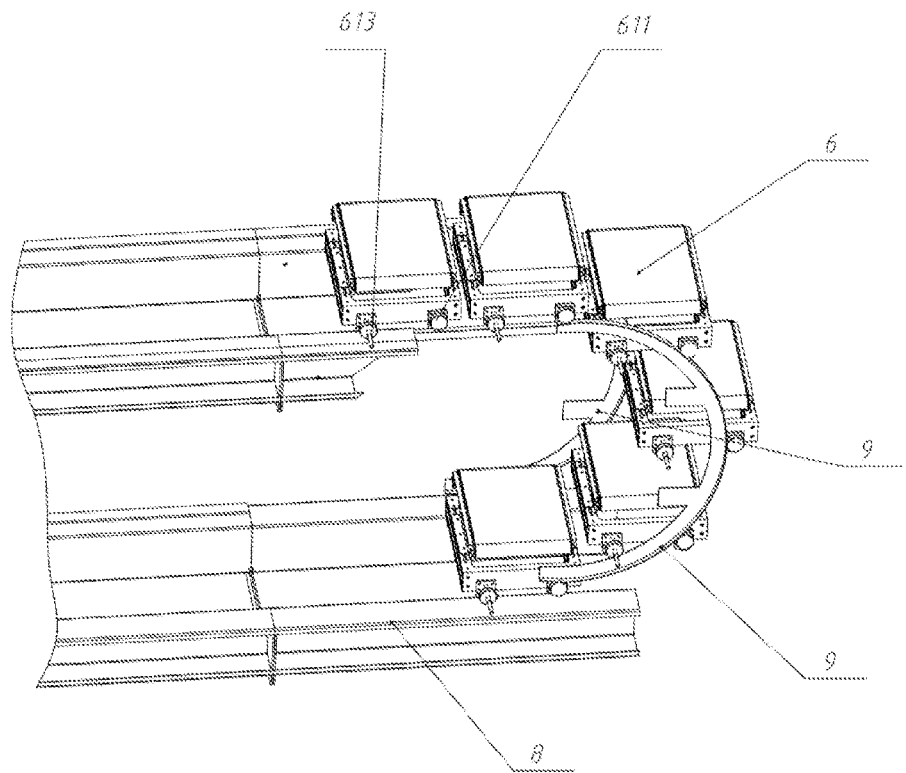
Figure 11:
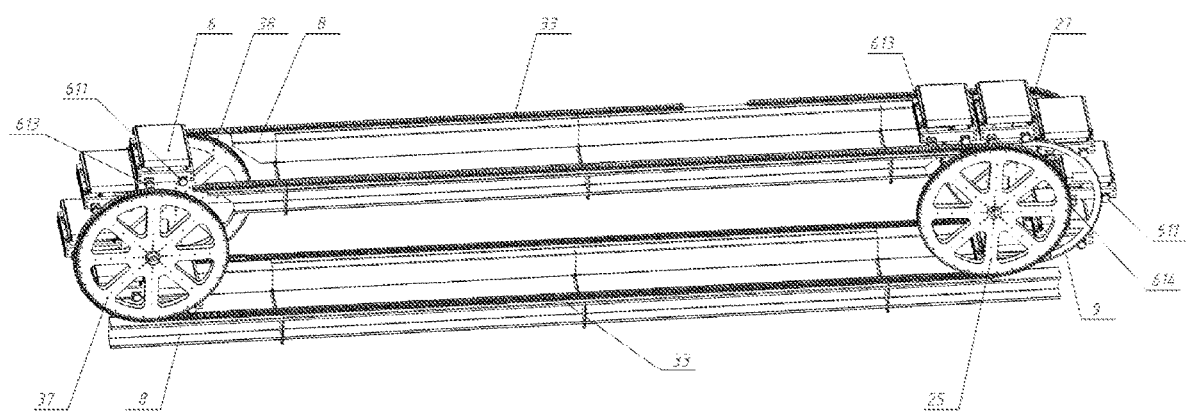
FIG. 11 is a diagram of a whole conveying mechanism of a sorting loop.

With reference to FIGS. 10 and 11 and the structural design of the driving component 12, the tensioning component 13, the straight rail 8 and the bent rail 9, it can be seen that the straight rail 8 is subjected to end chamfering when approaching the bent rail 9 to avoid interference with the disc assembly, one side of the straight rail 8 is disconnected from the bent rail 9, and the other side of the straight rail 8 is butted with the bent rail 9. The guide traveling wheel assemblies 613 of the sorting trolley 6 are separated and staggered on the two sides of the lower frame assembly 200 (in central symmetry horizontally), and the traveling wheel shaft 614 is connected to the synchronous belt 33. When the trolley 6 starts to transit from the straight rail 8 to the bent rail 9, the traveling wheel assembly 611 on one side of the trolley 6 transits from the straight rail 8 to the bent rail 9, while the traveling wheel assembly 611 on the other side is still on the straight rail 8. Due to the staggered design of the bent rail 9 and the center of the disc, it is ensured that the sorting trolley 6 is always in a horizontal state from the straight rail 8 to the bent rail 9, and then from the bent rail 9 to the straight rail 8 on the lower layer, thus realizing the supply and sorting of goods on the upper and lower layers.

To sum up, the embodiments given in conjunction with the drawings are only preferred schemes. Other alternative structures, conforming to the design concept of the invention, directly deduced by those skilled in the art under the enlightenment of the above embodiments should also belong to the scheme scope of the invention.

What is claimed is:

1. A dual-layer linear cross belt sorting system, comprising a package supply table, a sorting loop, a platform, sliding chutes and a scanning device, wherein the sorting loop is of a closed-loop and dual-layer linear conveying structure in a vertical direction, and the sorting loop comprises a plurality of sorting trolleys connected along a single queue, two sets of dual-layer rails formed by connecting bent rails located at two ends and straight rails located at upper and lower layers to each other by an internal welding, a driving component and a tensioning component;

the driving component and the tensioning component constitute a transmission structure of the sorting loop and the driving component and the tensioning component are located at two ends of the sorting loop respectively; and the two sets of dual-layer rails distributed along two sides of the plurality of sorting trolleys of the single queue and synchronous belts connected between the driving component and the tensioning component jointly constitute a vertical, dual-layer linear and closed-loop conveying mechanism of the sorting loop.

2. The dual-layer linear cross belt sorting system according to claim 1, wherein the driving component has a first driving disc assembly and a second driving disc assembly, the first driving disc assembly and the second driving disc assembly are wound from a same side end and drive two sets of synchronous belts;

the tensioning component has a first driven disc assembly and a second driven disc assembly, the first driven disc assembly and the second driven disc assembly are wound from a same side end and drive the two sets of synchronous belts;

the first driving disc assembly is staggered relative to a bent rail on a first side, and a vertical circle center of the first driving disc assembly coincides with a circle center of a vertical circle where the bent rail on a second side of the plurality of sorting trolleys is located;

the second driving disc assembly is staggered relative to the bent rail on the first side, and a vertical circle center of the second driving disc assembly coincides with the circle center of the vertical circle where the bent rail on the second side of the plurality of sorting trolleys is located; and the first driven disc assembly is staggered relative to the bent rail on the first side, and a vertical circle center of the first driven disc assembly coincides with the circle center of the vertical circle where the bent rail on the second side of the plurality of sorting trolleys is located; and the second driven disc assembly is staggered relative to the bent rail on the first side, and a vertical circle center of the second driven disc assembly coincides with the circle center of the vertical circle where the bent rail on the second side of the plurality of sorting trolleys is located.

3. The dual-layer linear cross belt sorting system according to claim 2, wherein each of the straight rails is chamfered at an end close to the bent rail, and each of the straight rails has a side disconnected from the bent rail and a side butted with the bent rail.

4. The dual-layer linear cross belt sorting system according to claim 3, wherein a first sprocket of the driving component is connected to an output shaft of a motor, the first sprocket is connected to second sprockets through a first chain, the second sprockets are fixedly connected to a first end of a first driving shaft, and a third sprocket is fixedly connected to a second end of the first driving shaft;

the third sprocket is connected to a fifth sprocket through a second chain, and one of the second sprockets fixed at the first end of the first driving shaft is connected to a fourth sprocket through a third chain;

the fourth sprocket is connected to the first driving disc assembly through a second driving shaft, and the fifth sprocket is connected to the second driving disc assembly through a third driving shaft;

the first driving disc assembly and the second driving disc assembly are of an identical structure;

a first tensioning shaft of the tensioning component is fixed to a right supporting frame through a first bearing seat and a second bearing seat, the first driven disc assembly is connected to the first tensioning shaft, and the first driven disc assembly and the first driving disc assembly are of an identical structure;

a second tensioning shaft is fixed to the right supporting frame through a third bearing seat and a fourth bearing seat, and the second driven disc assembly is connected to the second tensioning shaft; and the second driven disc assembly and the first driving disc assembly are of an identical structure.

5. The dual-layer linear cross belt sorting system according to claim 4, wherein the first driving disc assembly is composed of a flanged shaft, a first circular plate, a second circular plate, a bolt and a nylon spacer; and the first circular plate and the second circular plate are each provided with two fixing holes along an outer ring, the two fixing holes of the first circular plate correspond to the two fixing holes of the second circular plate, the first circular plate and the second circular plate are fixedly connected by the bolt and connected to the second driving shaft, and the nylon spacer is arranged outside the bolt.

6. The dual-layer linear cross belt sorting system according to claim 5, wherein a tooth socket of each of the synchronous belts is matched with a hinge pin assembly composed of the bolt and the nylon spacer of the first driving disc assembly.

7. The dual-layer linear cross belt sorting system according to claim 1, wherein each of the plurality of sorting trolleys is of a modular structure and has an upper conveying unit and a lower frame assembly, wherein the upper conveying unit and the lower frame assembly are connected;
the lower frame assembly comprises a frame profile and a frame, and traveling wheel assemblies and guide traveling wheel assemblies are fixedly connected to the frame;
two sets of the guide traveling wheel assemblies are distributed along the lower frame assembly in a central symmetry manner, and traveling wheel shafts are connected to the guide traveling wheel assemblies; and
a traveling wheel shaft is inserted into a pin hole of each of the synchronous belts of the sorting loop.

8. The dual-layer linear cross belt sorting system according to claim 2, wherein a first sprocket of the driving component is connected to an output shaft of a motor, the first sprocket is connected to second sprockets through a first chain, the second sprockets are fixedly connected to a first end of a first driving shaft, and a third sprocket is fixedly connected to a second end of the first driving shaft;
the third sprocket is connected to a fifth sprocket through a second chain, and one of the second sprockets fixed at the first end of the first driving shaft is connected to a fourth sprocket through a third chain;
the fourth sprocket is connected to the first driving disc assembly through a second driving shaft, and the fifth sprocket is connected to the second driving disc assembly through a third driving shaft;
the first driving disc assembly and the second driving disc assembly are of an identical structure;
a first tensioning shaft of the tensioning component is fixed to a right supporting frame through a first bearing seat and a second bearing seat, the first driven disc assembly is connected to the first tensioning shaft, and the first driven disc assembly and the first driving disc assembly are of an identical structure;
a second tensioning shaft is fixed to the right supporting frame through a third bearing seat and a fourth bearing seat, and the second driven disc assembly is connected to the second tensioning shaft; and
the second driven disc assembly and the first driving disc assembly are of an identical structure.

9. The dual-layer linear cross belt sorting system according to claim 2, wherein each of the plurality of sorting trolleys is of a modular structure and has an upper conveying unit and a lower frame assembly, wherein the upper conveying unit and the lower frame assembly are connected;
the lower frame assembly comprises a frame profile and a frame, and traveling wheel assemblies and guide traveling wheel assemblies are fixedly connected to the frame;
two sets of the guide traveling wheel assemblies are distributed along the lower frame assembly in a central symmetry manner, and traveling wheel shafts are connected to the guide traveling wheel assemblies; and
a traveling wheel shaft is inserted into a pin hole of each of the synchronous belts of the sorting loop.

10. The dual-layer linear cross belt sorting system according to claim 3, wherein each of the plurality of sorting trolleys is of a modular structure and has an upper conveying unit and a lower frame assembly, wherein the upper conveying unit and the lower frame assembly are connected;
the lower frame assembly comprises a frame profile and a frame, and traveling wheel assemblies and guide traveling wheel assemblies are fixedly connected to the frame;
two sets of the guide traveling wheel assemblies are distributed along the lower frame assembly in a central symmetry manner, and traveling wheel shafts are connected to the guide traveling wheel assemblies; and
a traveling wheel shaft is inserted into a pin hole of each of the synchronous belts of the sorting loop.

* * * * *